US010108125B2

(12) United States Patent
Yoshino

(10) Patent No.: US 10,108,125 B2
(45) Date of Patent: Oct. 23, 2018

(54) IMAGE FORMING APPARATUS

(71) Applicant: CANON KABUSHIKI KAISHA, Tokyo (JP)

(72) Inventor: Daiju Yoshino, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/625,058

(22) Filed: Jun. 16, 2017

(65) Prior Publication Data

US 2017/0364015 A1   Dec. 21, 2017

(30) Foreign Application Priority Data

Jun. 21, 2016   (JP) .................................. 2016-122954

(51) Int. Cl.
*G03G 15/00* (2006.01)
*G03G 21/16* (2006.01)

(52) U.S. Cl.
CPC ..... *G03G 15/5075* (2013.01); *G03G 15/5025* (2013.01); *G03G 15/80* (2013.01); *G03G 21/1604* (2013.01); *G03G 21/1652* (2013.01)

(58) Field of Classification Search
CPC ........... G03G 15/5025; G03G 15/5075; G03G 15/80; G03G 21/1604; G03G 21/1633; G03G 21/1652
See application file for complete search history.

(56) References Cited

U.S. PATENT DOCUMENTS

2015/0213923 A1*  7/2015  Yoshino ............. G03G 21/1652
                                                                399/177
2016/0124379 A1*  5/2016  Okumura ........... G03G 21/1633
                                                                399/107

FOREIGN PATENT DOCUMENTS

JP          2004-85944 A      3/2004

* cited by examiner

*Primary Examiner* — Hoang Ngo
(74) *Attorney, Agent, or Firm* — Fitzpatrick, Cella, Harper & Scinto

(57) ABSTRACT

An image forming apparatus includes an image forming portion, a casing, an image reading portion, a first controller substrate provided on one of side surfaces of the casing, a second controller substrate provided on the side surface, wherein a component mounting surface of the second controller substrate is in a non-overlapping position with a component mounting surface of the first controller substrate, an electric wire configured to connect the first controller portion and the image reading portion, and a shielding member fixed to the casing so as to be provided between the electric wire and the second controller substrate and configured to shield electromagnetic radiation from the second controller substrate toward the electric wire.

14 Claims, 4 Drawing Sheets

IMAGE FORMING APPARATUS

FIELD OF THE INVENTION AND RELATED ART

The present invention relates to an image forming apparatus such as a printer, a copying machine, a facsimile machine or a multi-function machine.

Conventionally, in the image forming apparatus, a constitution in which in addition to a main controller substrate for controlling an image forming operation, an auxiliary controller substrate (additional substrate) for imparting a facsimile (FAX) function is capable of being additionally mounted has been known. For example, Japanese Laid-Open Patent Application (JP-A) 2004-85944 discloses a constitution in which a FAX function expansion board is directed connected with an on-board connector of a controlling board for controlling a mechanical operation of the image forming apparatus.

Further, conventionally, an image forming apparatus in which an image reading portion is provided at an upper portion of a casing and in which a scanner function and a printer function are realized in combination has been known. In such a constitution, image information acquired at the image forming portion is transmitted to a main controller substrate provided on a side surface of the casing in many cases.

As regards the image forming apparatus including the image reading portion, as in the image forming apparatus disclosed in JP-A 2004-85944, it would be considered that an additional substrate is made additionally mountable. In this case, it would be considered that the image forming apparatus is downsized by spacing the additional controller substrate from the main controller substrate thereby to cause a cover member for covering these controller substrates to approach the casing side surface. However, in such a constitution, an electric wire connecting the image reading portion and the main controller substrate passes through the neighborhood of the additional substrate in some cases, so that there was a liability that a signal transmitted via the electric wire is deteriorated by electromagnetic noise generating from the additional substrate.

SUMMARY OF THE INVENTION

A principal object of the present invention is to provide an image forming apparatus capable of reducing an influence of electromagnetic noise on an electric wire connecting an image reading portion and a controller substrate in a constitution in which a plurality of controller substrates are provided on a side surface of a casing.

According to an aspect of the present invention, there is provided an image forming apparatus comprising: an image forming portion configured to form an image; a casing configured to accommodate the image forming portion; an image reading portion provided above the casing and configured to read image information from an original; a first controller substrate provided on one of side surfaces of the casing and configured to control the image forming portion on the basis of the image information from the image reading portion; a second controller substrate provided on the side surface, wherein a component mounting surface of the second controller substrate is in a non-overlapping position with a component mounting surface of the first controller substrate; an electric wire configured to connect the first controller portion and the image reading portion and provided along the component mounting surface of the second controller substrate; and a shielding member fixed to the casing so as to be provided between the electric wire and the second controller substrate and configured to shield electromagnetic radiation from the second controller substrate toward the electric wire.

Further features of the present invention will become apparent from the following description of exemplary embodiments with reference to the attached drawings.

DESCRIPTION OF EMBODIMENTS

Figure 1:
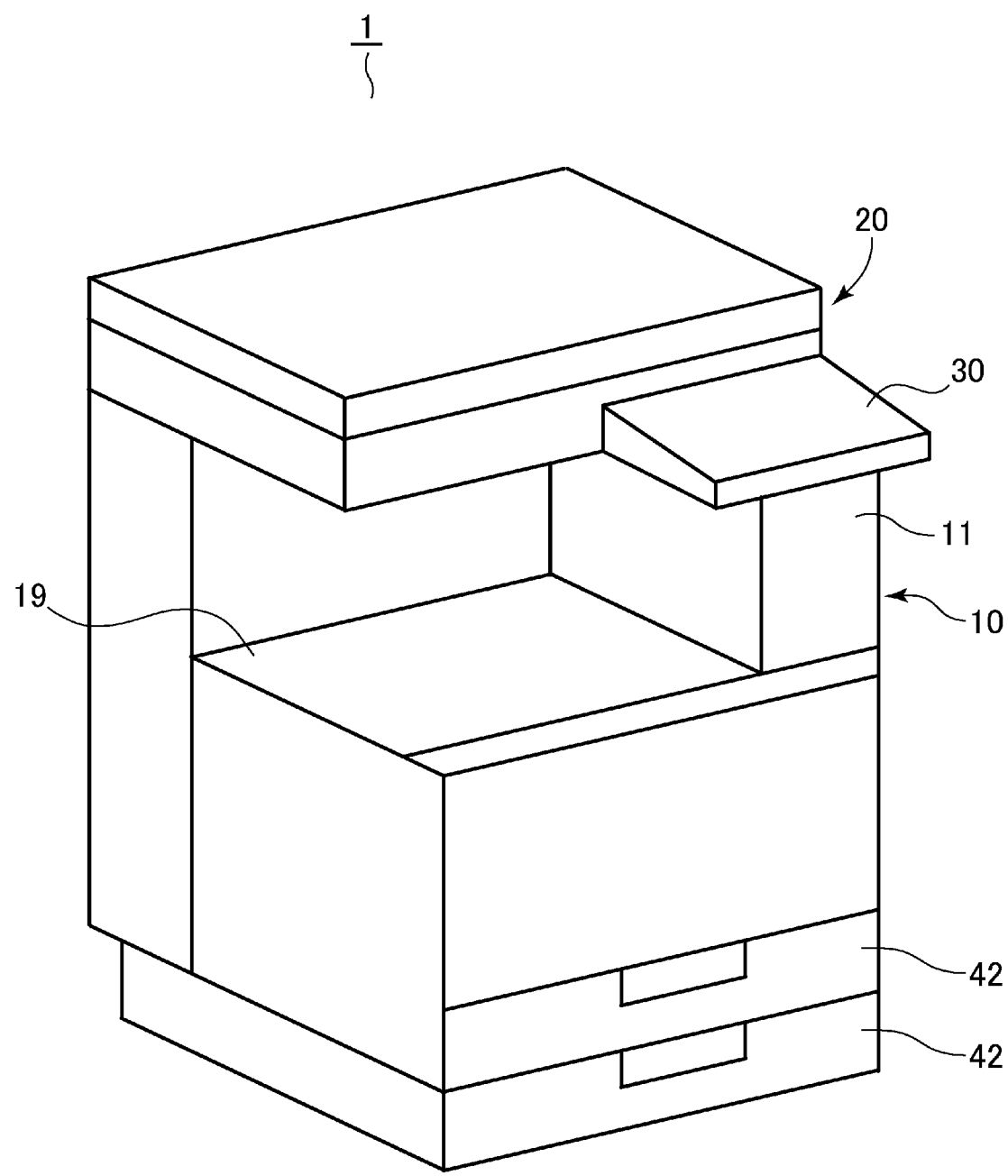
FIG. 1 is a perspective view of an image forming apparatus according to the present invention.

An image forming apparatus according to the present invention will be described with reference to the drawings. An image forming apparatus 1 shown in FIG. 1 is a full-color laser printer. In the following description, as regards a side (right from side of FIG. 1) where an operating portion 30 is provided on an apparatus main assembly 10, a side surface in the side is a "front surface" and a side surface in a side opposite from the (front surface) side is a "rear surface". Further, a right-hand side surface of the apparatus main assembly 10 as seen from the front surface side is a "right side surface" and a side surface in a side opposite from the (right side surface) side is a "left side surface".

The image forming apparatus 1 roughly includes the apparatus main assembly 10 and an image reading portion 20 provided on the apparatus main assembly 10. The apparatus main assembly 10 incorporates an image forming portion 101 described later, and form an image on a recording material fed from a feeding cassette 42 and discharges the recording material onto a discharge tray 19. Further, at an upper portion of the apparatus main assembly 10, the operation portion 30, including a liquid crystal panel and buttons and the like, for operating the image forming apparatus 1 by a user is disposed.

Figure 2:
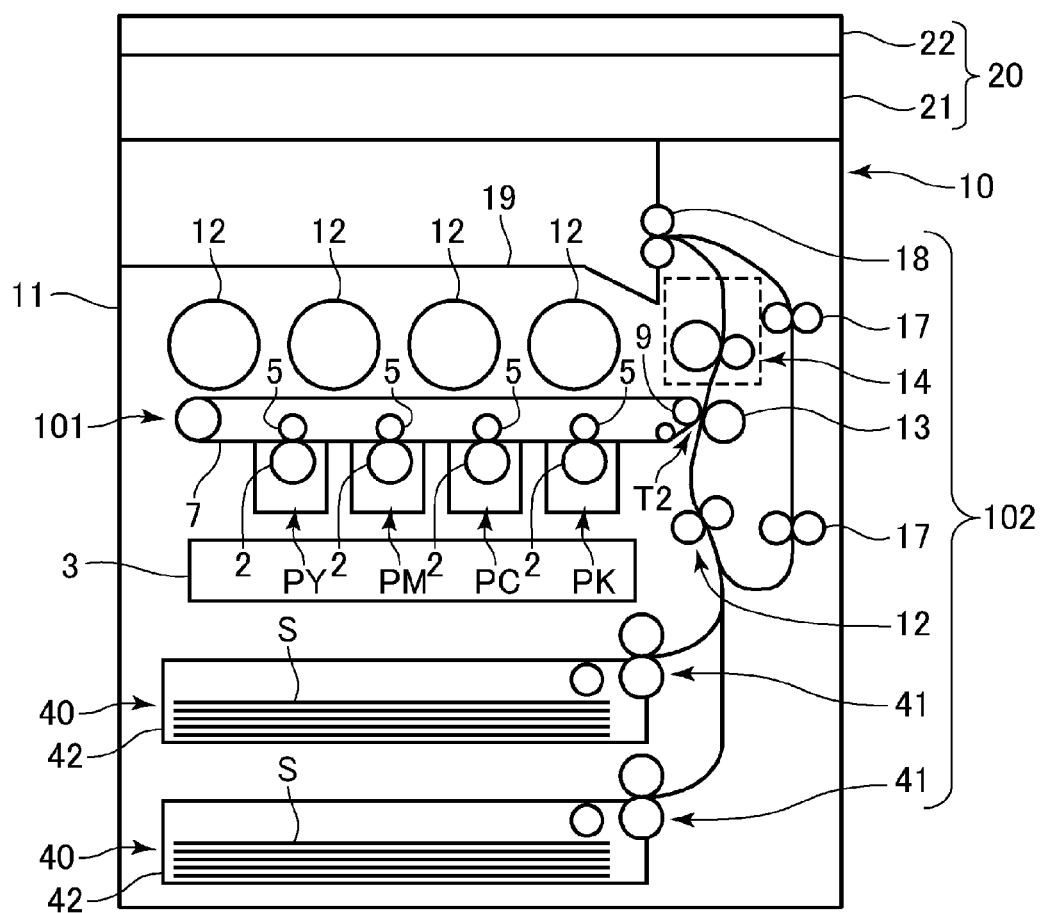
FIG. 2 is a schematic view showing a structure of the image forming apparatus.

As shown in FIG. 2, the image reading portion 20 for reading image information from an original includes a reading device body 21 provided with a platen glass and a platen cover 22 openable relative to the reading device body 21. The original placed on the platen glass is subjected to extraction of the image information by being scanned by a scanning optical system, of a CCD type, a CIS type or the like, incorporated in the reading device body 21.

The image forming portion 101 for forming the image on the basis of the image information received from the image reading portion 20 or an external device is accommodated inside a casing 11 constituting the apparatus main assembly 10. The image forming portion 101 has a constitution of a so-called tandem intermediary transfer type in which four image forming unit is PY, PM, PC and PK each including a photosensitive drum 2 are provided. The image forming units PY, PM, PC and PK form toner images of yellow (Y), magenta (M), cyan (C) and black (K), so that an image is formed on a recording material S via an intermediary transfer belt 7.

In each of the image forming units PY, PM, PC and PK, at a periphery of the photosensitive drum 2 which is a photosensitive member such as an organic photoconductor (OPC) member, a charger, a developing device and a cleaner (which are not shown) are provided. The photosensitive drum 2 is electrically charged at a surface thereof uniformly by the charger, and thereafter is exposed to laser light emitted from an exposure unit 3, so that an electrostatic latent image is formed on the surface of the photosensitive drum 2. The developing device supplies a charged toner to the photosensitive drum 2 and develops the electrostatic latent image into a toner image. The toner image formed on the photosensitive drum 2 is primary-transferred onto the intermediary transfer belt 7 by a primary transfer roller 5 opposing the photosensitive drum 2 via the intermediary transfer belt 7.

The intermediary transfer belt 7 which is an intermediary transfer member is rotationally driven in a predetermined direction along a feeding direction (upward direction in FIG. 1) of the recording material S at a secondary transfer portion T2. On the surface of the intermediary transfer belt 7, monochromatic toner images formed by the respective image forming units are multiple-transferred and thus a full-color toner image is formed. The toner image carried on the intermediary transfer belt 7 is secondary-transferred onto the recording material S at the secondary transfer portion T2 formed between a secondary transfer roller 13 and an opposite roller 9.

In parallel to such an image forming process, the recording material S is supplied to the image forming portion 101 by respective elements of a feeding system 102 provided in the apparatus main assembly 10. A feeding portion 40 provided at a lower portion of the apparatus main assembly 10 includes a feeding cassette 42 for accommodating the recording material S and a feeding unit 41 for separating and feeding the recording material S, accommodated in the feeding cassette 42, one by one. The recording material S is a thin layer recording medium including paper such as a sheet or an envelope, or a plastic film such as a film for an overhead projector.

The recording material S fed by the feeding unit 41 is subjected to correction of oblique movement by a registration roller pair 12, and is fed toward the secondary transfer portion T2 by the registration roller pair 12 in synchronism with transfer timing of the toner image. At the secondary transfer portion T2, the recording material S on which the (unfixed) toner image is formed is fed to a fixing device 14 including a roller pair and a heating source and the like, in which the recording material S is heated and pressed. As a result, the toner is melt-fixed on the recording material S, and the recording material S on which a fixed image is formed is discharged by a discharging roller pair 18 onto a discharge tray 19 provided at an upper portion of the image forming portion 101. In the case of double-side printing, the recording material S is fed by the discharging roller pair 18 in a switch-back manner, and thereafter, the recording material S is fed to the image forming portion 101 again by a feeding roller pair 17 for the double-side printing. Then, when the image is formed on a back surface of the recording material S at the secondary transfer portion T2 and the fixing device 14, the recording material S is discharged onto the discharge tray 19 by the discharging roller pair 18.

[Arrangement of Controller Substrates and the Like]

Figure 3:
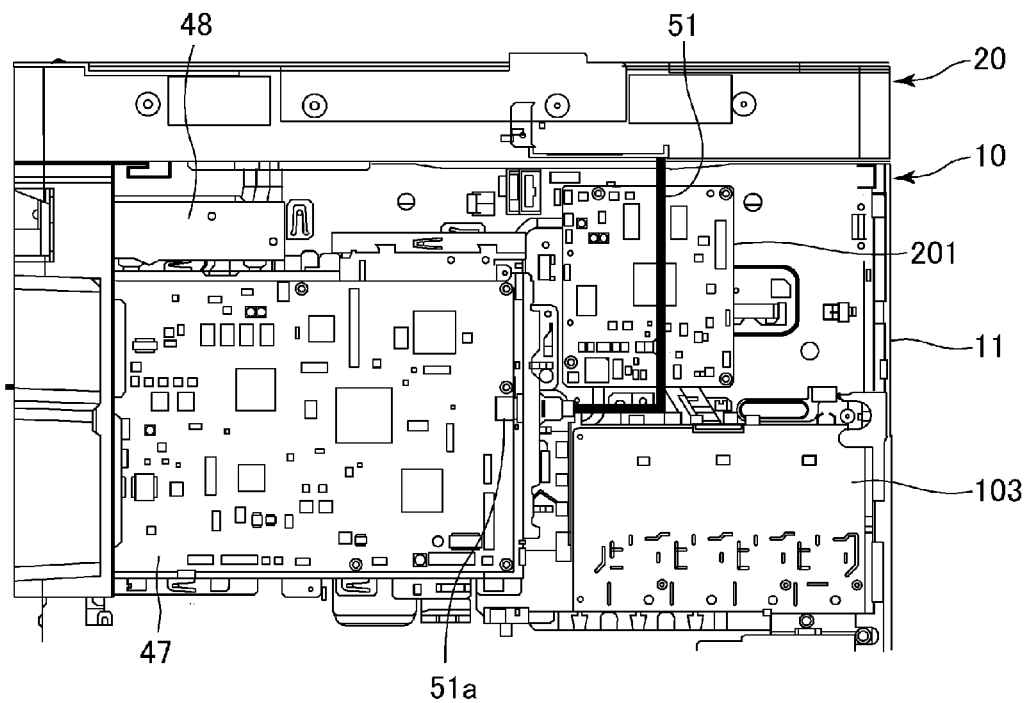
FIG. 3 is a rear view, of an upper portion of an apparatus main assembly, showing controller substrates and a wiring path.

A constitution of the image forming apparatus 1 at a rear surface which is a side surface in one of sides of the image forming apparatus 1 will be described. As shown in FIG. 3, at an upper portion of a rear surface of the casing 11, a main board 47 as a first controller substrate for controlling the image forming apparatus 1 is provided. The main board 47 is connected with the image reading portion 20 via an electric wire (cable) 51, and controls an operation of the image forming portion 101 and the feeding system 102 on the basis of image information received from the image reading portion 20 and an operating signal inputted through the operating portion 30.

At a position deviated from the main board 47 as seen from the rear surface side, a power source substrate 103 for supplying electric power to the image forming portion 101 is provided. The "position deviated from (the main board 47)" means that the power source substrate 103 and the main board 47 are in a positional relationship in which these members do not substantially overlap with each other except for a connector portion and a screw fastening constitution to the casing 11 and the like. The power source substrate 103 generates DC and AC high voltages and applies bias voltages to the chargers and the primary transfer rollers 5 of the image forming units PY, PM, PC and PK, and the secondary transfer roller 13 and the like.

In the image forming apparatus 1, an expansion board 201 which is an additional substrate is additionally mounted, so that it is possible to impart a function other than an image forming function (printing function). The expansion board 201 is an example of a second controller substrate. As such an extended function, it is possible to cite a communicating function (for example, a facsimile function and a network function) capable of sending image information to and receiving the image information from an external device via a telecommunication line. Further, it would be also considered that not only a finisher, an option feeder or the like is connected but also a substrate on which a controll function for controlling these additional devices is packaged is additionally mounted as the secondary controller substrate. Accordingly, the image forming apparatus 1 is capable of not only being used as a printer having a scanner function and a printing function in a state in which the expansion board 201 is demounted but also extending the function so as to meet a user's demand by mounting the expansion board 201.

In addition, at the back surface of the casing 11, for example, a hard disk device (HDD) 48 connected with the main board 47 is provided. These members such as the main board 47, the expansion board 201, the HDD 48 and the power source substrate 103 are covered with a rear surface cover (not shown) detachably mountable to the casing 11.

A positional relationship among the main board 47, the expansion board 201 and the power source substrate 103 will be described. These substrates may preferably be disposed so as to be spaced from each other since each of these substrates generates heat and electromagnetic noise during an operation thereof. On the other hand, from the viewpoint of downsizing of the apparatus main assembly 10, it is desired that these substrates including wiring for connecting these substrates are accommodated inside a contour of the casing 11 as seen from the rear surface side. Further, in general, the power source substrate 103 has a larger weight than the main board 47 and the expansion board 201, and therefore, these is a need to take a weight balance of the apparatus main assembly 10 into consideration.

Therefore, in this embodiment, these substrates are not only disposed at positions spaced from each other as seen in a flat surface, i.e., as seen from the rear surface side, but also have a constitution in which an influence of the electromagnetic noise is reduced by a holding member 50 described later.

Specifically, it is suitable that the main board 47 is disposed in one side with respect to a widthwise direction (left-right direction), and the expansion board 201 and the power source substrate 103 are disposed in the other side with respect to the widthwise direction. At this time, not only the power source substrate 103 is disposed below the expansion board 201, but also the connecting portion 51a for connecting the electric wire 51 with the main board 47 is disposed at a side end portion and above the power source substrate 103.

By such an arrangement, it becomes easy to design a wiring path of the electric wire 51 so as to avoid the power source substrate 103 which has large internal energy and which is liable to constitute a generating source of the electromagnetic noise. Further, the connecting portion 51a is positioned at the side end portion of the main board 47, and therefore, the electric wire 51 is connectable to the main board 47 from a one end side with respect to the widthwise direction. For this reason, even in the case where an interval between the main board 47 and the image reading portion 20 with respect to a vertical (up-down) direction is narrow, compared with a constitution in which the connecting portion 51a is disposed at an upper end portion, a connecting operation of the electric wire 51 becomes easy. Further, the power source substrate 103 having a relatively large weight is positioned below the expansion board 201, so that stability of the apparatus main assembly 10 is improved.

Figure 4:
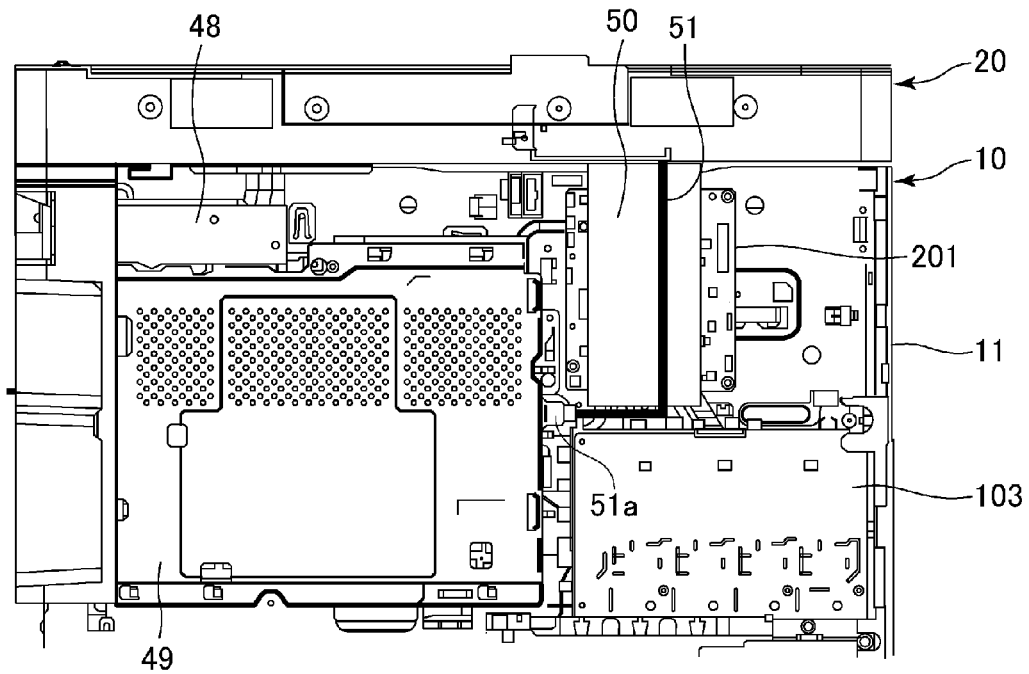
FIG. 4 is a rear view of the upper portion of the apparatus main assembly on which a holding member is mounted.

In such an arrangement, the electric wire 51 extends via an overlapping position with the expansion board 201 as seen from the rear surface side. Therefore, as shown in FIG. 4, the holding member 50 is provided between the electric wire 51 and the expansion board 201 and is caused to hold the electric wire 51. The holding member 50 has a size capable of covering at least a region where the electric wire 51 and the expansion board 201 overlap with each other and is formed of a material, such as an electroconductor which is metal or the like or a resin material having an electroconductor film, capable of shielding electromagnetic wave generating from the expansion board 201.

As a result, the expansion board 201 is disposed at the position deviated from the main board 47, and in a constitution in which the electric wire 51 passes through the rear surface side of the expansion board 201, the influence of the electromagnetic noise on the electric wire 51 can be reduced. Further, the image information read by the image reading portion 20 is transmitted to the main board 47 without being influenced by the electromagnetic noise, whereby faithfulness of an output image, outputted by the image forming apparatus 1, on an original image is improved. However, the output image includes not only the toner image formed on the recording material S but also image information sent to the external device.

In the above, the constitution in which the first controller substrate and the second controller substrate are disposed on the rear surface as one of the side surface in one side of the apparatus main assembly was described, but these controller substrates may also be disposed on another side surface (right side surface, for example) of the apparatus main assembly.

Figure 5:
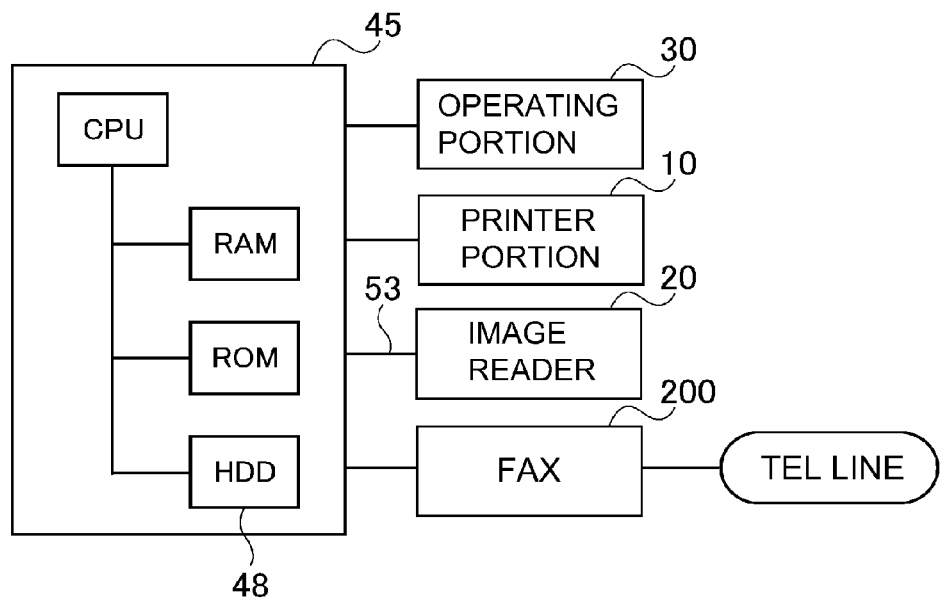
FIG. 5 is a block diagram showing a control constitution of the image forming apparatus.
Figure 6:
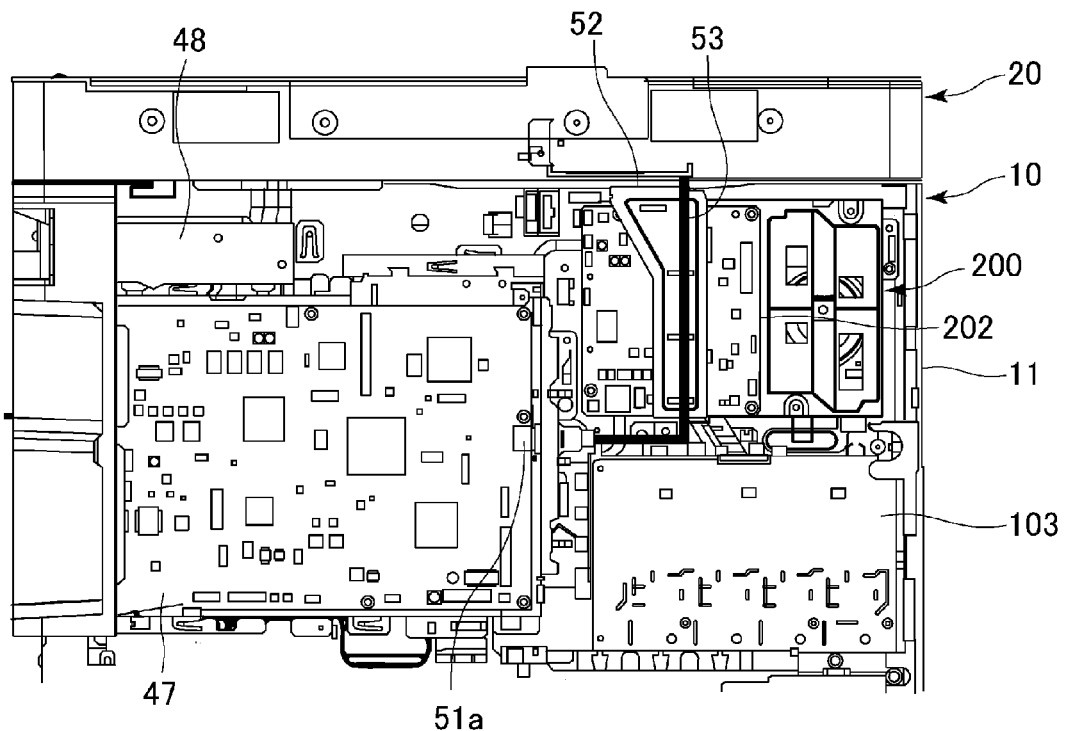
FIG. 6 is a rear view of the upper portion of the apparatus main assembly on which a FAX substrate is mounted.

As an example to which the above-described embodiment is applied, an image forming apparatus 1 in which a FAX board 200, as the second controller substrate, having the facsimile function is mounted will be described. As shown in FIGS. 5 and 6, a main controller 45 of the image forming apparatus 1 includes a central processing unit (CPU), a storing device (RAM, ROM) and a HDD 48 which are mounted on the main board 47. The main controller 45 controls an operation of an entirety of the image forming apparatus 1 by sending signals to and receiving the signals from the respective portions, of the image forming apparatus 1, such as the operating portion 30, the image forming portion 101 and the image reading portion 20.

The FAX board 200 in this embodiment is interposed between the main board 47 and a telephone line and sends image information, received from the main board 47, to a remote external device via the telephone line, or processes signals received from the external device and then transmits the signals, as image information, to the main board 47. The FAX board 200 includes a controller substrate 202, as the second controller substrate, having a modem function for modulating a signal, corresponding to image information, depending on a characteristic of the telephone line.

Further, a USB cable 53 is held by a holding member 52 provided so as to cover a plurality of integrated circuits mounted on the controller substrate 202. As a result, in the image forming apparatus 1 having the FAX function, the influence of the electromagnetic noise generating from the FAX board 200 is reduced, so that faithfulness of the output image can be improved.

According to the present invention, in a constitution in which a plurality of controller substrates are provided on a side surface of a casing, the influence of electromagnetic noise on an electric wire connecting an image reading portion and the controller substrates can be reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-122954 filed on Jun. 21, 2016, which is hereby incorporated by reference herein in its entirety.

What is claimed is:

1. An image forming apparatus comprising:
   an image forming portion configured to form an image;
   a casing configured to accommodate said image forming portion;
   an image reading portion provided above said casing and configured to read image information from an original;
   a first controller substrate provided on one of side surfaces of said casing and configured to control said image forming portion on the basis of the image information from said image reading portion;
   a second controller substrate provided on the side surface, wherein a component mounting surface of said second controller substrate is in a non-overlapping position with a component mounting surface of said first controller substrate;
   an electric wire configured to connect said first controller substrate and said image reading portion and provided along the component mounting surface of said second controller substrate; and
   a shielding member fixed to said casing so as to be provided between said electric wire and said second controller substrate and configured to shield electromagnetic radiation from said second controller substrate toward said electric wire.

2. An image forming apparatus according to claim 1, wherein said shielding member holds said electric wire.

3. An image forming apparatus according to claim 2, wherein said shielding member is formed of a material containing metal.

4. An image forming apparatus according to claim 2, wherein said shielding member is a resin member coated with an electroconductive film.

5. An image forming apparatus according to claim 1, wherein said second controller substrate is disposed adjacent to said first controller substrate with respect to a horizontal direction, and
wherein said first controller substrate includes a connecting portion with which said electric wire is connectable in a side closer to said second controller substrate than a center of said first controller substrate is.

6. An image forming apparatus according to claim 1, further comprising a power source substrate configured to supply electric power to said image forming portion and provided on the side surface so as to be adjacent to said first controller substrate with respect to a horizontal direction in the same side as said second controller substrate and so as to be adjacent downwardly to said second controller substrate with respect to a vertical direction.

7. An image forming apparatus according to claim 1, wherein said second controller substrate is an additional substrate added to said first controller substrate.

8. An image forming apparatus according to claim 7, wherein said second controller substrate is capable of sending the image information to an external device and is capable receiving the image information from the external device via a telecommunication line.

9. An image forming apparatus according to claim 1, wherein a plurality of integrated circuits are mounted on the component mounting surface of said second controller substrate, and
wherein said shielding member covers the plurality of integrated circuits.

10. An image forming apparatus comprising:
an image forming portion configured to form an image;
a casing configured to accommodate said image forming portion;
an image reading portion provided above said casing and configured to read image information from an original;
a first controller substrate provided inside said casing at a position closer to a rear side of said image forming apparatus than a position of said image forming portion is and configured to control said image forming portion so that an image is formed based on the image information;
a second controller substrate provided inside said casing at a position closer to the rear side of said image forming apparatus than the position of said image forming portion is and configured to communicate with an external device via a telephone line, wherein a component mounting surface of said second controller substrate is in a non-overlapping position with a component mounting surface of said first controller substrate;
an electric wire configured to connect said first controller substrate and said image reading portion and provided along the component mounting surface of said second controller substrate; and
a shielding member provided between said electric wire and said second controller substrate and configured to shield electromagnetic radiation from said second controller substrate toward said electric wire.

11. An image forming apparatus according to claim 10, wherein said shielding member holds said electric wire.

12. An image forming apparatus according to claim 11, wherein said shielding member is formed of a material containing metal.

13. An image forming apparatus according to claim 11, wherein said shielding member is a resin member coated with an electroconductive film.

14. An image forming apparatus according to claim 10, wherein said second controller substrate is disposed adjacent to said first controller substrate with respect to a horizontal direction, and
wherein said first controller substrate includes a connecting portion with which said electric wire is connectable in a side closer to said second controller substrate than a center of said first controller substrate is.

* * * * *